(12) United States Patent
Bertrand et al.

(10) Patent No.: US 11,104,586 B2
(45) Date of Patent: Aug. 31, 2021

(54) WATER RECYCLING SYSTEM AND METHOD

(71) Applicants: Guillaume Bertrand, Calgary (CA); Jeremy Leclerc, Calgary (CA)

(72) Inventors: Guillaume Bertrand, Calgary (CA); Jeremy Leclerc, Calgary (CA)

( * ) Notice: Subject to any disclaimer, the term of this patent is extended or adjusted under 35 U.S.C. 154(b) by 553 days.

(21) Appl. No.: 15/218,247

(22) Filed: Jul. 25, 2016

(65) Prior Publication Data
US 2018/0022618 A1 Jan. 25, 2018

(51) Int. Cl.
| | | |
|---|---|---|
| *C02F 1/00* | (2006.01) | |
| *C02F 9/00* | (2006.01) | |
| *B01D 36/00* | (2006.01) | |
| *E03B 1/04* | (2006.01) | |
| *E03B 5/02* | (2006.01) | |
| *C02F 1/44* | (2006.01) | |
| *C02F 103/42* | (2006.01) | |

(Continued)

(52) U.S. Cl.
CPC .............. *C02F 1/001* (2013.01); *B01D 36/00* (2013.01); *C02F 1/008* (2013.01); *C02F 9/00* (2013.01); *E03B 1/041* (2013.01); *B01D 2201/16* (2013.01); *C02F 1/004* (2013.01); *C02F 1/02* (2013.01); *C02F 1/283* (2013.01); *C02F 1/32* (2013.01); *C02F 1/444* (2013.01); *C02F 2103/002* (2013.01); *C02F 2103/42* (2013.01); *C02F 2209/005* (2013.01); *C02F 2209/02* (2013.01); *C02F 2209/03* (2013.01); *C02F 2301/046* (2013.01); *C02F 2307/06* (2013.01); *E03B 5/025* (2013.01); *E03B 2001/045* (2013.01); *Y02A 20/148* (2018.01); *Y02A 20/30* (2018.01); *Y02W 10/37* (2015.05)

(58) Field of Classification Search
None
See application file for complete search history.

(56) References Cited

U.S. PATENT DOCUMENTS

| | | | | |
|---|---|---|---|---|
| 4,228,006 A | * | 10/1980 | Hanna ................... | C02F 3/1242 210/167.3 |
| 2008/0017566 A1 | * | 1/2008 | Hill ........................... | C02F 3/04 210/295 |

(Continued)

FOREIGN PATENT DOCUMENTS

| | | |
|---|---|---|
| CA | 2093247 A1 | 10/1994 |
| CA | 2475443 A1 | 6/2003 |

(Continued)

*Primary Examiner* — Jonathan M Peo
(74) *Attorney, Agent, or Firm* — David Guerra

(57) ABSTRACT

The present invention describes a liquid recycling system and method for purifying and either recirculating or discarding of liquid. The system includes a liquid input line, a tank, and a circulation pump for providing recirculation of liquid from the tank. A filter and a heater are used to treat liquid from the circulation pump. A valve is provided to direct liquid either to a shower head or faucet, or back to the tank. Additional plumbing and components can be used to provide multiple independent recirculation loops with the tank. An electronic controller can be used to control components of the present invention, where a user could interface with the controller via a control panel or a software application accessed by a portable electronic device.

20 Claims, 9 Drawing Sheets

(51) Int. Cl.
*C02F 1/02* (2006.01)
*C02F 1/28* (2006.01)
*C02F 1/32* (2006.01)
*C02F 103/00* (2006.01)

(56) References Cited

U.S. PATENT DOCUMENTS

| | | |
|---|---|---|
| 2011/0146800 A1 | 6/2011 | Jallon et al. |
| 2012/0199220 A1 | 8/2012 | Knepp et al. |
| 2012/0260417 A1 | 10/2012 | LeBlanc |
| 2013/0177475 A1 | 7/2013 | Finch |
| 2013/0256234 A1 | 10/2013 | Miller et al. |
| 2014/0008279 A1 | 1/2014 | De Garay Arellano |
| 2014/0053909 A1* | 2/2014 | Savage ............... E03B 1/041 137/1 |
| 2014/0138321 A1 | 5/2014 | Koch |
| 2015/0021247 A1 | 1/2015 | Lin-Hendel |
| 2015/0076254 A1 | 3/2015 | Farley |
| 2015/0175440 A1 | 6/2015 | Schoendorfer |
| 2015/0204055 A1 | 7/2015 | Khalifeh |
| 2015/0344323 A1 | 12/2015 | Mahdjoubi Namin |
| 2016/0002938 A1 | 1/2016 | Vale et al. |
| 2016/0030862 A1 | 2/2016 | Wang |
| 2016/0115675 A1* | 4/2016 | Quigley ............... E03B 1/042 700/282 |

FOREIGN PATENT DOCUMENTS

| | | | |
|---|---|---|---|
| CA | 2400546 A1 | 3/2004 | |
| CA | 2400546 A1 * | 3/2004 | ......... A47L 15/4291 |
| CA | 2571239 A1 | 12/2005 | |
| CA | 2621209 A1 | 3/2007 | |
| CA | 2652143 A1 | 8/2009 | |
| CA | 2626171 A1 | 9/2009 | |
| CA | 2727150 A1 | 12/2009 | |
| CA | 2677866 A1 | 2/2011 | |
| CA | 2814611 A1 | 4/2012 | |
| CA | 2475443 C | 5/2012 | |
| CA | 2756783 A1 | 5/2012 | |
| CA | 2834309 A1 | 11/2012 | |
| CA | 2677866 C | 2/2013 | |
| CA | 2857629 A1 | 6/2013 | |
| CA | 2868932 A1 | 10/2013 | |
| CA | 2820623 A1 | 12/2013 | |
| CA | 2756783 C | 11/2014 | |
| WO | WO-2013095278 A1 * | 6/2013 | ............. E03B 1/042 |

* cited by examiner

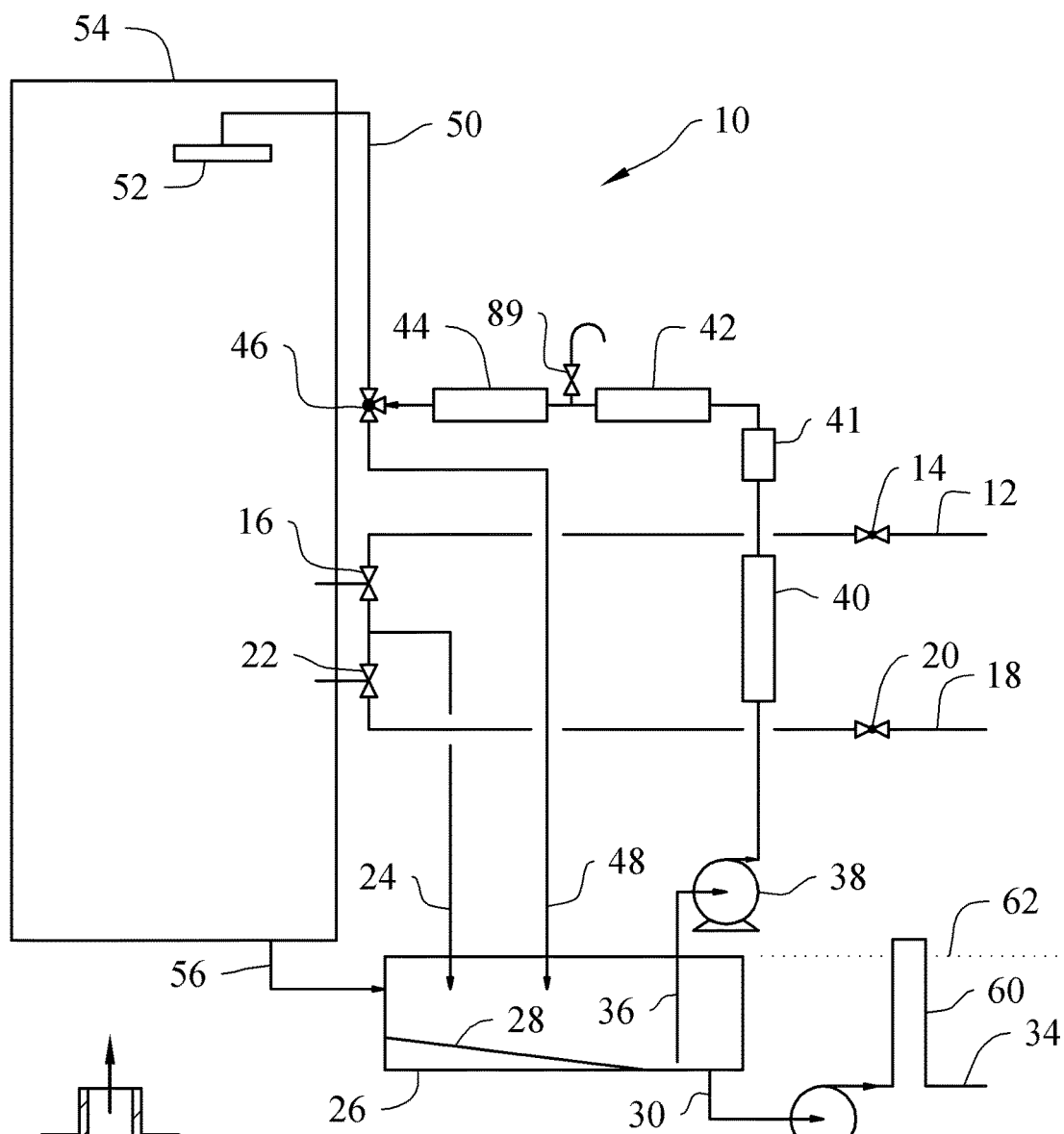
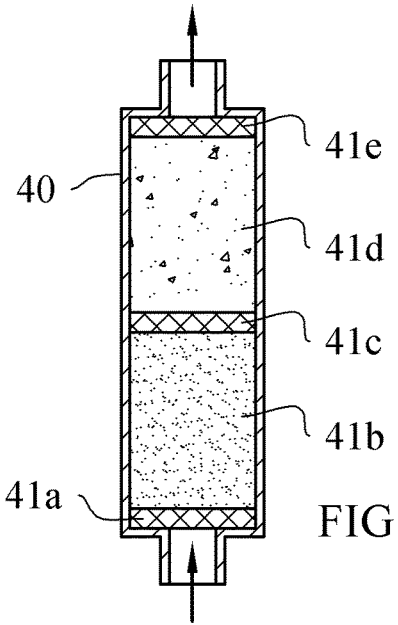
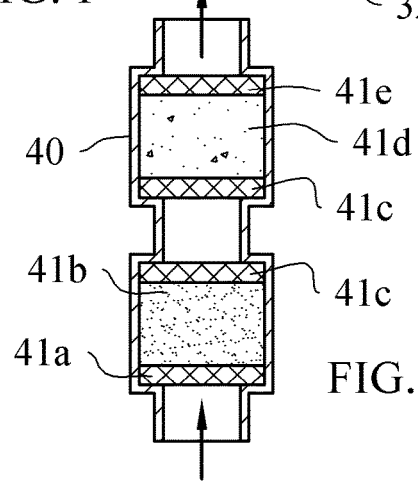
FIG. 1
FIG. 2A
FIG. 2B

WATER RECYCLING SYSTEM AND METHOD

BACKGROUND OF THE INVENTION

Field of the Invention

The present invention relates to a water recycling system and method for use in connection with purification, reclamation and reuse of grey water for domestic or industrial uses.

Description of the Prior Art

In many parts of the world chronic, and often severe, water shortages exist. This water shortage can be contributed from unusually low rainfall and drought conditions, substandard water servicing infrastructure, pollution by industry, businesses and homeowners, or deliberate tampering.

Although these water shortage problems may be ameliorated, in the short term by several years of good rainfall, the long term prognosis is unfavorable considering the increases in population and the ever-increasing need for water. As a result, effective water conservation practices are needed if water-scarce regions of the world are to prosper or survive.

Industries, governments and municipalities have become aware of this shortage and have developed elaborate and expensive treatment facilities for reclaiming used water and reusing the water for industrial purposes. However, such facilities are extremely costly and have, therefore, generally been limited to large industries which can afford the cost, and especially those industries in which the cost of using reclaimed water is less than the cost of water supplied by local water districts or municipalities.

Water conservation is becoming increasingly important as the cost of treating domestic or industrial water increases and sources of clean feedstock become scarce. In most domestic or industrial households treated domestic or industrial water is used to bath, wash and/or flush toilets. Without the use of an instant hot water device, a person would leave the water tap on until hot water has reached the faucet, thus resulting in a waste of valuable water. It also increases the cost of sewage treatment charged to the home owner because the municipal cost of sewage treatment is largely based on the amount of domestic or industrial water consumed. To address this issue, grey water or water recycling systems have been developed and are known in the public domain.

While the above-described devices fulfill their respective, particular objectives and requirements, the aforementioned patents do not describe a water recycling system and method that allows purification, reclamation and reuse of grey water for domestic or industrial uses. T Therefore, a need exists for a new and improved water recycling system and method that can be used for purification, reclamation and reuse of grey water for domestic or industrial uses. In this regard, the present invention substantially fulfills this need. In this respect, the water recycling system and method according to the present invention substantially departs from the conventional concepts and designs of the prior art, and in doing so provide an apparatus primarily developed for the purpose of purification, reclamation and reuse of grey water for domestic or industrial uses.

BRIEF SUMMARY OF THE INVENTION

In view of the foregoing disadvantages inherent in the known types of grey water recycling systems now present in the prior art, the present invention provides an improved water recycling system and method, and overcomes the above-mentioned disadvantages and drawbacks of the prior art. As such, the general purpose of the present invention, which will be described subsequently in greater detail, is to provide a new and improved water recycling system and method which has all the advantages of the prior art mentioned heretofore and many novel features that result in a water recycling system and method which is not anticipated, rendered obvious, suggested, or even implied by the prior art, either alone or in any combination thereof.

To attain this, the present invention essentially comprises a liquid recycling system for purifying and either recirculating or discarding of liquid. The liquid recycling system includes at least one liquid input line, at least one tank in communication with the liquid input line, at least one circulation pump in communication with the interior of the tank, at least one filter in communication with an output of the circulation pump by way of a tank output line, at least one heater associated with the tank output line, and at least one valve having an input in communication with the tank output line. The tank includes an interior capable of receiving liquid from the liquid input line. The circulation pump has a configuration capable of pumping liquid from the interior of the tank. The valve includes a first output in communication with a liquid usage device, and a second output in communication with the interior of the tank. The tank is capable of receiving liquid from the liquid usage device.

The filter includes a first geotextile element associated with a filter input side, a quartz element downstream of the first geotextile element, an activated carbon element downstream of the second geotextile element, and a second geotextile element downstream of the activated carbon element.

There has thus been outlined, rather broadly, the more important features of the invention in order that the detailed description thereof that follows may be better understood and in order that the present contribution to the art may be better appreciated.

The invention may also include a ultra-violet system in communication with the tank output line and downstream of the circulation pump.

The invention may also include at least one by-pass line in communication with the liquid input line and a usage device line associated with the liquid usage device. The by-pass line can be in communication with the liquid input line upstream of the tank. The by-pass line can be in communication with the usage device line downstream of the valve.

An additional feature of the invention can include a drain pump in communication with the interior of the tank. The drain pump can include an output in communication with at least one drain line that includes a section at an elevation higher than an elevation of the tank.

The invention may also include at least one temperature sensing device, and at least one pressure sensing device both of which can be in communication with the tank output line between the heater and the valve.

The liquid input line can include at least one liquid input valve in communication with a liquid source, wherein the second output of the valve is in communication with the interior of the tank by way of a second tank input line.

A third tank input line can be in communication with the tank output line downstream of the circulation pump and with the interior of the tank. The third tank input line can include a third tank input line valve.

The invention may further include at least one controller having internal electronics configured to operate the controller. The controller can have a configuration capable of receiving a signal from the temperature sensing device and, the pressure sensing device and the position switch, respectively, and providing a control signal to at least one of the heater, the ultra-violet system, the valve, the liquid input valve, the circulation pump, the drain pump, and the third tank input line valve, respectively.

Additionally, the invention can include at least one second by-pass line in communication with the liquid input line and a second liquid usage device. With a fourth tank input line in communication with the second by-pass line and the interior of said tank. The second by-pass line can include at least one second by-pass line valve, and the fourth tank input line can include a restricted orifice.

Furthermore, the invention can include a second drain pump in communication with the interior of the tank. The second drain pump can include an output line in communication with the drain line, wherein the output line includes a section at an elevation higher than the elevation of the tank.

Still further, the invention can include a tank overflow line in communication with the interior of the tank and with the drain line. The tank overflow line can include a trap section.

Even still further, the liquid usage device is associated with a bathing assembly selected from the group consisting of a shower stall, and a bathtub stall, and wherein the liquid usage device is selected from the group consisting of a shower head, and a faucet. The tank can include a floor surface having a slopping configuration toward an input of a tank drain line. The tank can be remote from the bathing assembly, and the tank can be capable of receiving liquid from the bathing assembly. Alternatively, the tank can be integral with a base of the bathing assembly.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water recycling system and method that has all of the advantages of the prior art grey water recycling systems and none of the disadvantages.

It is another object of the present invention to provide a new and improved water recycling system and method that may be easily and efficiently manufactured and marketed.

An even further object of the present invention is to provide a new and improved water recycling system and method that has a low cost of manufacture with regard to both materials and labor, and which accordingly is then susceptible of low prices of sale to the consuming public, thereby making such water recycling system and method economically available to the buying public.

Still another object of the present invention is to provide a new water recycling system and method that provides in the apparatuses and methods of the prior art some of the advantages thereof, while simultaneously overcoming some of the disadvantages normally associated therewith.

Even still another object of the present invention is to provide a water recycling system and method for purification, reclamation and reuse of grey water for domestic or industrial uses. This allows for preheating water using a recirculation loop prior to showering and without wasting water during the heating process. Additionally, used or grey water from the shower can be purified and recirculated back to the shower head while requiring no additional water input, thereby maintaining the recirculated water a desired temperature.

Lastly, it is an object of the present invention to provide a new and improved method of recirculating water by allowing a user to manually or electronically operate the water recycling system of the present invention. The user could: schedule initial operation of the shower for predetermined times and/or days; select water temperature with an accuracy of less than 1° C.; monitor water and gas or electric usage; and/or remind the user for any maintenance job. The user can control the water recycling system using an application, program or interface stored on or accessed by an electronic device.

The user is capable of having a shower even if there is a power failure or the user is unable to communicate with the controller. This can be accomplished by rotating twice the shower valve manually, which directs water to the shower head and/or back to the tank. The user would preset a default temperature, and a position switch associated with the controller prepares the shower at the preset temperature. Thereby allowing the user to always be able to have a shower.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic view of an embodiment of the water recycling system constructed in accordance with the principles of the present invention.

FIGS. 2A and 2B are cross-sectional views of embodiments of the filter of the water recycling system of the present invention.

The same reference numerals refer to the same parts throughout the various figures.

DETAILED DESCRIPTION OF THE INVENTION

Figure 3:
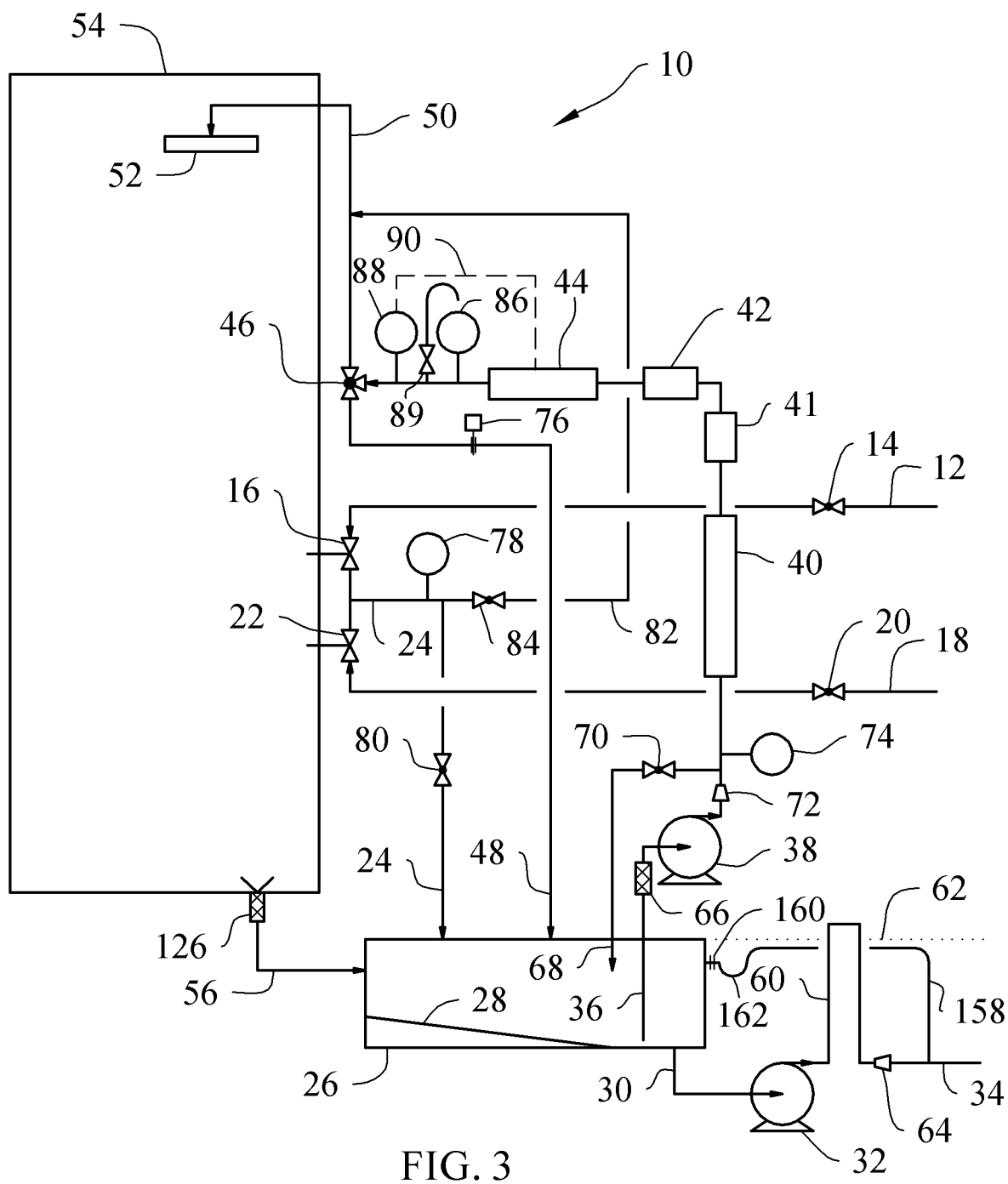
FIG. 3 is a schematic view of an alternate embodiment of the water recycling system of the present invention.

Referring now to the drawings, and particularly to FIGS. 1-10, an embodiment of the water recycling system and method of the present invention is shown and generally designated by the reference numeral 10.

In FIG. 1, an embodiment of the water recycling system and method 10 of the present invention for purification, reclamation and reuse of grey water for domestic or industrial uses is illustrated and will be described. More particularly, the water recycling system 10 can include a hot water line 12 in communication with a hot water source or heating assembly (not shown), a cold water line 18 in communication with a cold water source or cooling assembly (not shown), and at least one recirculation loop in communication with a tank 26 and a water/liquid usage device 52, such as but not limited to, a shower head, faucet, spray nozzle, steam nozzle, fogger, mister, venturi or atomizer. The water usage device 52 can be associated with a bathing assembly, such as but not limited to, a shower or bath stall 54. The shower 54 as described herein is for exemplary purposes, and it can be appreciated that any water usage system can be used in place of any of the presently described embodiments of the present invention.

The hot water line 12 can include a hot water shut off valve 14 upstream of a hot water dosing/control valve 16. The cold water line 18 can include a cold water shut off valve 20 upstream of a cold water dosing/control valve 22. The hot water line 12 and the cold water line 18 merge into a first tank input line 24 downstream of the hot water dosing valve 16 and the cold water dosing valve 22. The first tank input line 24 is in communication with an interior of the tank 26.

The tank 26 can be any enclosed or partially enclosed container, and can include a sloping floor surface 28. The floor surface 28 slopes toward a tank drain line 30 at an angle around 1°-10°, with an angle of around 5° being adequate.

The tank drain line 30 is in communication with a drain pump 32 which outputs to a drain line 34. The drain line 34 can output or be in communication with a sewage system or water treatment system (not shown). The drain line 34 can include a seal leg 60 with a section higher than a tank elevation 62.

A tank output line 36 is in communication with the interior of the tank 26 and a circulation pump 38. The circulation pump 38 outputs to at least one filter 40. As best illustrated in FIG. 2A, the filter 40 can be a canister-like filter including, but not limited to, an input geotextile element 41a, a quartz filter element 41b, an intermediate geotextile element 41c, a carbon filter element 41d, and an output geotextile element 41e. The filter 40 can include attachment fittings at its ends to facilitate installation and removal of the filter 40 with the tank output line 36. The filter 40 can be an axial filter with liquid flowing axially through the filter elements. Additionally, the filter 40 can include an access panel to assist in replacing the any or all the elements enclosed in the filter. Optionally, as best illustrated in FIG. 2B, the filter 40 can include multiple chambers with a first chamber including the geotextile element 41a, the quartz filter element 41b and the intermediate geotextile element 41c, and a second chamber including the intermediate geotextile element 41c, the carbon filter element 41d, and the output geotextile element 41e. The quartz filter element 41b can be any quartz filtering system, such as but not limited to, microfiber, fiber, membrane, salt, silica or sand. The carbon filter element 41d can be any carbon filtering system, including but not limited to, activated carbon.

The tank output line 36 continues downstream of the filter 40 to additional liquid treatment units, such as but not limited to, a 1 μm (micron) filter 41, a ultra-violet (UV) system 42 and a heater 44. It can be appreciated that the heater 44 can be upstream or downstream the UV system 42. Additionally, a vent valve 89 can be in communication with the tank output line 36 upstream of the shower valve 46. The tank output line 36 then continues to a shower valve 46.

A second tank input line 48 communicates with an output of the shower valve 46 to the interior of the tank 26 to create a possible first recirculation loop. A shower line 50 communicates a secondary output of the shower valve 46 to a shower head 52.

The shower 54 includes a shower drain line 56 in communication with the tank 26 to create a possible second recirculation loop. The shower drain line 56 can include a sloped horizontal section at an angle around 1°-10°, with an angle of around 5° being adequate. The angle is configured to allow liquid to gravity drain toward the tank 26.

The first recirculation loop can be envisioned from the tank 26 to the tank output line 36, to the shower valve 46, and then back to the tank 26 via the second tank input line 48.

A possible second recirculation loop can be envisioned from the tank 26 to the tank output line 36, to the shower valve 46, to the shower line 50, to the shower 54, and then back to the tank 26 via the shower drain line 56.

It can be appreciated that the water recycling system 10 can be a retrofittable unit that attaches to an existing shower/bath plumbing system which includes the hot water line 12 and cold water line 18, and their corresponding shut off valves 14, 20 and dosing valves 16, 22. The retrofittable unit, or portions thereof, can be installed to existing shower system to create a recirculation loop between the shower line 50 and the shower drain line 56. It can also be appreciated that the water recycling system 10 can be a modular and/or self-contained unit integrally incorporated with a shower or bathtub, thereby simplifying installation and/or manufacture.

In use, it can now be understood that a user can operate the hot and/or cold water dosing valves 16, 22 for a desired water temperature. The water outputs the dosing valves 16, 22 and merges to the first tank input line 24 to the tank 26. The tank 26 directs any water toward the tank drain line 30 and the tank output line 36 because of the sloped floor 28. The circulation pump 38 pumps water from the tank 26 through the filter 40, the 1 μm filter 41, the UV system 42 and the heater 44 and then to the shower valve 46. The shower valve 46 can be a manually operated valve which allows the user the ability to direct water to the shower head 52 and/or back to the tank 26. Water draining from the shower 54 is inputted into the tank 26. The water in the tank 26 is drained by the drain pump 32.

It can be appreciated that the circulation pump 38 can recirculate water from the tank 26 through the filter 40, the 1 μm filter 41, the UV system 42 and the heater 44 to the shower 54, and then back to the tank 26 so as to elevate and maintain the water at the predetermined temperature while reducing overall water use. The circulation pump 38 can also recirculate water from the tank 26 to the shower 54, thereby further reducing overall water use.

In FIG. 3, an embodiment of the water recycling system and method 10 of the present invention is illustrated and will be described. More particularly, this embodiment of the water recycling system 10 includes the hot water line 12, the cold water line 18, and at least one recirculation loop in communication with the tank 26 and the shower 54.

The hot water line 12 can include the hot water shut off valve 14 upstream of the hot water dosing valve 16. The cold water line 18 can include the cold water shut off valve 20 upstream of the cold water dosing valve 22. The hot water line 12 and the cold water line 18 combine into the first tank input line 24 downstream of the hot water dosing valve 16 and the cold water dosing valve 22. The first tank input line 24 is in communication with the interior of the tank 26. The first tank input line 24 can also include a temperature indicator 78 and a shut off valve 80.

The tank 26 can be any enclosed or partially enclosed container, and can include the sloping floor surface 28. The floor surface 28 slopes toward the tank drain line 30 at an angle around 1°-10°, with an angle of around 5° being adequate. The tank drain line 30 is in communication with the drain pump 32 which outputs to the drain line 34. The drain line 34 includes a seal leg 60 with a section higher than a tank elevation 62. The drain line 34 can output or be in communication with a sewage system or water treatment system (not shown). The drain line 34 can further include an optional reducer/expander 64 located downstream of the seal leg 60.

The tank output line 36 is in communication with the interior of the tank 26 and the circulation pump 38. A filter 66 is associated with the tank output line 36 upstream of the circulation pump 38. The circulation pump 38 outputs to the filter 40.

The tank output line 36 continues downstream of the filter 40 to the additional liquid treatment units, such as but not limited to, the 1 μm filter 41, the UV system 42 and the heater 44, and then to the shower valve 46. A pressure sensing device 86 and a temperature sensing device 88 are in communication with the tank output line 36 downstream of the heater 44 and upstream of the shower valve 46. The temperature sensing device 88 is capable of providing a control signal 90 to the heater 44. Additionally, the vent valve 89 can be in communication with the tank output line 36 upstream of the shower valve 46.

The second tank input line 48 communicates with an output of the shower valve 46 to the interior of the tank 26 to create the first recirculation loop. The second tank input line 48 can include a restricted orifice 76, which can include a controllable or variable orifice.

A third tank input line 68 is in communication with the interior of the tank 26 and the output line of the circulation pump 38 upstream of the filter 40. The third tank input line 68 can also include a shut off valve 70.

The output line of the circulation pump 38 can include an optional reducer/expander 72 and a pressure sensing device 74. The optional reducer/expander 72 can be located between the circulation pump 38 and where the third tank input line 68 connects with the output line of the circulation pump 38. The pressure sensing device 74 can be located between the filter 40 and where the third tank input line 68 connects with the output line of the circulation pump 38.

The shower line 50 communicates an output of the shower valve 46 to the shower head 52.

The shower 54 can include a shower drain line 56 in communication with the tank 26 to create the second recirculation loop, and a filter 126 associated with the shower drain line 56 or a drain of the shower 54. The shower drain line 56 can include a sloped horizontal section at an angle around 1°-10°, with an angle of around 5° being adequate. The angle is configured to allow liquid to gravity drain toward the tank 26.

A by-pass line 82 can be in communication with the first tank input line 24 and the shower line 50. The by-pass line 82 can include a shut off valve 84. The by-pass line 82 can be in communication with the first tank input line 24 downstream of the temperature indicator 78 and upstream of the shut off valve 80.

A tank overflow line 158 can be included which is in communication with the tank 26 and the drain line 34. The overflow line 158 can be coupled to the tank via a union 160, and can also include a trap 162. An inlet of the overflow line 158 can be located higher than an inlet for the first tank drain line 30 but lower than the tank elevation 62 to transfer any overflow to the drain line 34.

The first recirculation loop can be envisioned from the tank 26 to the tank output line 36, to the shower valve 46, and then back to the tank 26 via the second tank input line 48.

The second recirculation loop can be envisioned from the tank 26 to the tank output line 36, to the shower valve 46, to the shower line 50, to the shower 54, and then back to the tank 26 via the shower drain line 56.

A possible third recirculation loop can be envisioned from the tank 26 to the tank output line 36, to the third tank input line 68, and then back to the tank 26.

It can be appreciated that the water recycling system 10 of FIG. 3 can be a retrofittable unit that attaches to an existing shower/bath plumbing system which includes the hot water line 12 and cold water line 18, and their corresponding shut off valves 14, 20 and dosing valves 16, 22. The water recycling system 10 of FIG. 3, or portions thereof, can be retrofitted to existing shower/bath systems to create a recirculation loop between the shower line 50 and the shower drain line 56. It can also be appreciated that the water recycling system 10 of FIG. 3 can be a modular and/or self-contained unit integrally incorporated with a shower or bathtub, thereby simplifying installation and/or manufacture.

In use, it can now be understood that a user can operate the water recycling system 10 of FIG. 3 by controlling the hot and/or cold water dosing valves 16, 22 for a desired water temperature. The water outputs the dosing valves 16, 22 and merges to the first tank input line 24 which can direct the water to either the tank 26 or the by-pass line 82. The user can control the water temperature by viewing the temperature indicator 78. The circulation pump 38 pumps water from the tank 26 through the filter 40, the 1 μm filter 41, the UV system 42 and the heater 44 and then to the shower valve 46. The temperature sensing device 88 provides a signal to the heater 44 to control operation of the heater 44 to heat the water to a desired temperature. The shower valve 46 can be a manually operated valve which allows the user the ability to direct water to the shower head 52 and/or back to the tank 26. Water draining from the shower 54 is inputted into the tank 26. Upon a power failure or if the circulation pump 38 fails to operate, water can still be provided to the shower head 52 via by-pass line 82. The water in the tank 26 is drained by the drain pump 32.

It can be appreciated that the circulation pump 38 can recirculate water from the tank 26 through the filter 40, the 1 μm filter 41, the UV system 42 and the heater 44 to the shower 54, and then back to the tank 26 so as to elevate and maintain the water at the predetermined temperature while reducing overall water use. The circulation pump 38 can also recirculate water from the tank 26 to the shower 54, thereby further reducing overall water use.

Figure 4:
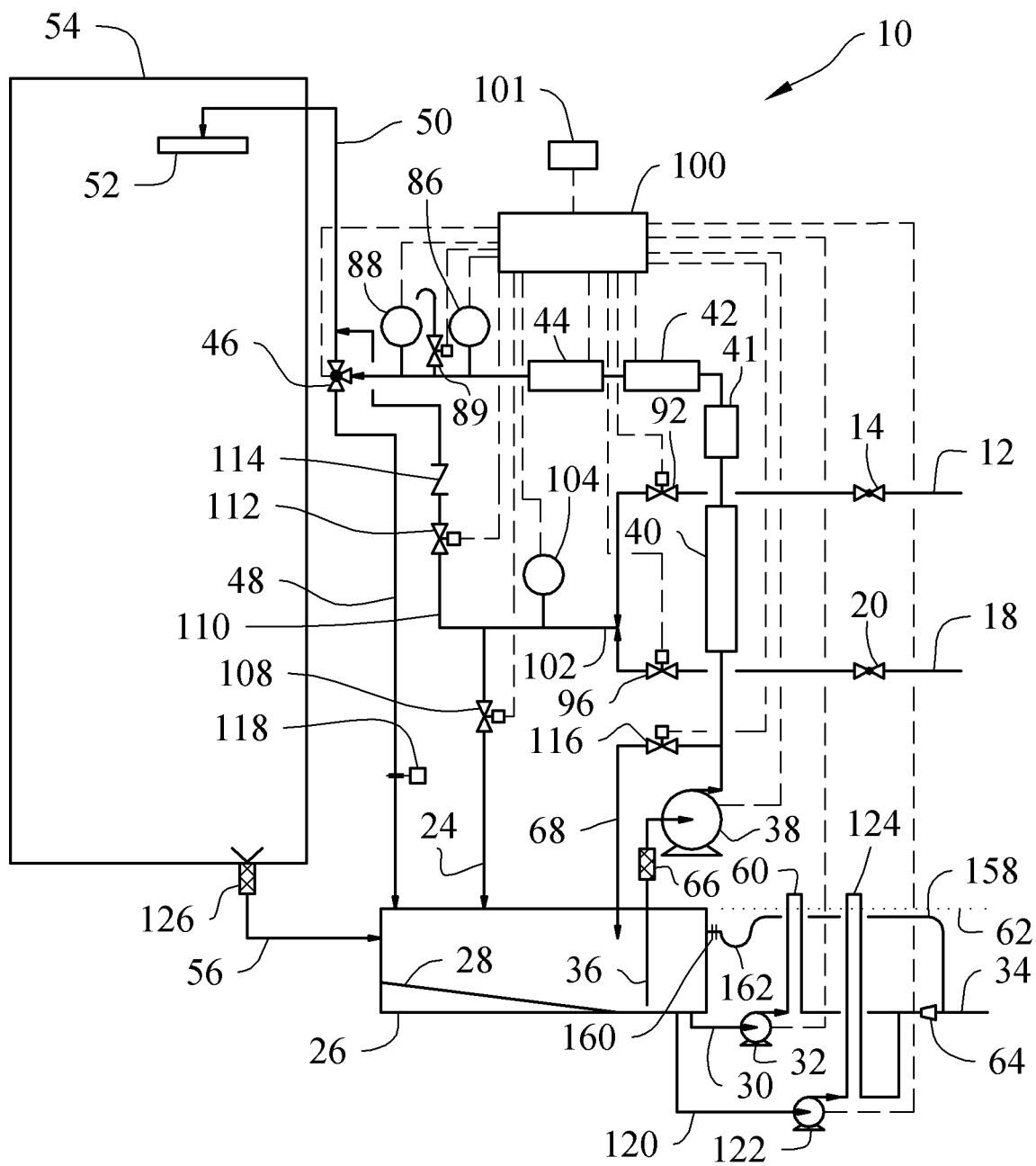
FIG. 4 is a schematic view of an electronically controllable embodiment of the water recycling system of the present invention with an independent tank option.

In FIG. 4, an electronically controllable embodiment of the water recycling system and method 10 of the present invention is illustrated and will be described. More particularly, this embodiment of the water recycling system 10 includes the hot water line 12, the cold water line 18, at least one recirculation loop in communication with the tank 26 and the shower 54, and a controller 100 in connection with a power supply or source 101.

The controller 100 can include a processor, memory devices, interface modules, communication modules, a transmitter, a receiver, a transceiver, a modem, input and/or output buses, peripheral connection modules, and any electrical components necessary to provide operation. The power supply 101 can be any power source capable of providing AC or DC power to the controller 100 for suitable operation of the controller and all components controlled by and in communication with the controller. The controller 100 can also be in communication with a remote computer system for providing and/or receiving data. A user device can be in direct and/or indirect communication with the controller 100 for providing and/or receiving data between them to assist in the operation of the water recycling system and method 10.

The hot water line 12 can include the hot water shut off valve 14 upstream of a hot water valve 92. The cold water line 18 can include the cold water shut off valve 20 upstream of a cold water valve 96. The hot water line 12 and the cold water line 18 combine into a merge line 102 downstream of the control valves 92, 96. The merge line 102 is in communication with the shower line 50 downstream of the shower valve 46 via a by-pass line 110. The merge line 102 can include a temperature sensing device 104 in communication with and capable of sending a signal to the controller 100. The by-pass line 110 can include a shower input line valve 112 in communication with and controllable by the controller 100, and a check valve 114. The shower input line valve 112 can be downstream of the temperature sensing device 104, and the check valve 114 can be downstream of the shower input line valve 112. The hot water valve 92, the cold water valve 96 and the shower input line valve 112 are in communication with and may be controlled by the controller 100.

The first tank input line 24 is in communication with the interior of the tank 26 and the merge line 102. The first tank input line 24 can include an optional valve 108 in communication with and may be controlled by the controller 100. The first tank input line 24 can be in communication with the merge line 102 between the temperature sensing device 104 and the shower input line valve 112.

The tank 26 can be any enclosed or partially enclosed container, and can include the sloping floor surface 28. The floor surface 28 slopes toward the tank drain line 30 at an angle around 1°-10°, with an angle of around 5° being adequate. The tank drain line 30 is in communication with the drain pump 32 which outputs to the drain line 34. The drain line 34 includes the seal leg 60 with a section higher than the tank elevation 62. The drain line 34 can further include the optional reducer/expander 64 located downstream of the seal leg 60.

A second tank drain line 120 can be included which is in communication with the tank 26 and a second drain pump 122. The second drain pump 122 outputs to a second seal leg 124 with a section higher than the tank elevation 62. The second seal leg 124 is in communication with the drain line 34 upstream of the optional reducer/expander 64. The second drain line 120 and second drain pump 122 can be utilized as a backup drain system upon failure of the drain pump 32 and/or clogging of the tank drain line 30. The drain pumps 32, 122 can be in communication with and may be controlled by the controller 100.

A tank overflow line 158 can be included which is in communication with the tank 26 and the drain line 34. The overflow line 158 can be coupled to the tank via a union 160, and can also include a trap 162. An inlet of the overflow line 158 can be located higher than an inlet for the first and second tank drain lines 30, 120 but lower than the tank elevation 62 to transfer any overflow to the drain line 34.

The tank output line 36 is in communication with the interior of the tank 26 and the circulation pump 38. The circulation pump 38 can be in communication with and may be controlled by the controller 100. The filter 66 is associated with the tank output line 36 upstream of the circulation pump 38. The circulation pump 38 outputs to the filter 40.

The tank output line 36 continues downstream of the filter 40 to the additional liquid treatment units, such as but not limited to, the 1 μm filter 41, UV system 42 and the heater 44, and then to the shower valve 46. The UV system 42, the heater 44 and the shower valve 46 are in communication with and can be controlled by the controller 100, wherein the shower valve 46 can also include a position/limit switch in communication with the controller 100. The pressure sensing device 86 and the temperature sensing device 88 are in communication with the tank output line 36 downstream of the heater 44 and upstream of the shower valve 46. The pressure sensing device 86 and the temperature sensing device 88 are in communication with the controller 100 and are capable of providing a signal to the controller 100. Additionally, a vent valve 89 can be in communication with the tank output line 36 upstream of the shower valve 46. The vent valve 89 is in communication with and may be controlled by the controller 100.

The second tank input line 48 communicates with an output of the shower valve 46 to the interior of the tank 26 to create the first recirculation loop. The second tank input line 48 can include the restricted orifice 76, which can be a fixed or variable orifice, and which additionally can be in communication with and controlled by the controller 100.

The third tank input line 68 is in communication with the interior of the tank 26 and the output line of the circulation pump 38 upstream of the filter 40, thereby creating a return loop. The third tank input line 68 can also include a valve 116 in communication with and can be controlled by the controller 100.

The shower line 50 communicates an output of the shower valve 46 to the shower head 52.

The shower 54 includes the shower drain line 56 in communication with the tank 26 to create the second recirculation loop. The shower drain line 56 can include a filter 126 and the sloped horizontal section can be at an angle around 1°-10°, with an angle of around 5° being adequate. The angle is configured to allow liquid to gravity drain toward the tank 26. It can be appreciated that the filter 126 can optionally be associated with a drain of the shower 54.

The first recirculation loop can be envisioned from the tank 26 to the tank output line 36, to the shower valve 46, and then back to the tank 26 via the second tank input line 48.

A possible second recirculation loop can be envisioned from the tank 26 to the tank output line 36, to the shower valve 46, to the shower line 50, to the shower 54, and then back to the tank 26 via the shower drain line 56.

The third recirculation loop can be envisioned from the tank 26 to the tank output line 36, to the third tank input line 68, and then back to the tank 26.

It can be appreciated that the water recycling system 10 of FIG. 4 can be a retrofittable unit that attaches to an existing shower/bath plumbing system which includes the hot water line 12 and cold water line 18, and their corresponding shut off valves 14, 20 and dosing valves 16, 22. The water recycling system 10 of FIG. 4, or portions thereof, can be retrofitted to existing shower/bath systems to create a recirculation loop between the shower line 50 and the shower drain line 56. It can also be appreciated that the water recycling system 10 of FIG. 4 can be a modular and/or self-contained unit integrally incorporated with a shower or bathtub, thereby simplifying installation and/or manufacture.

Figure 5:
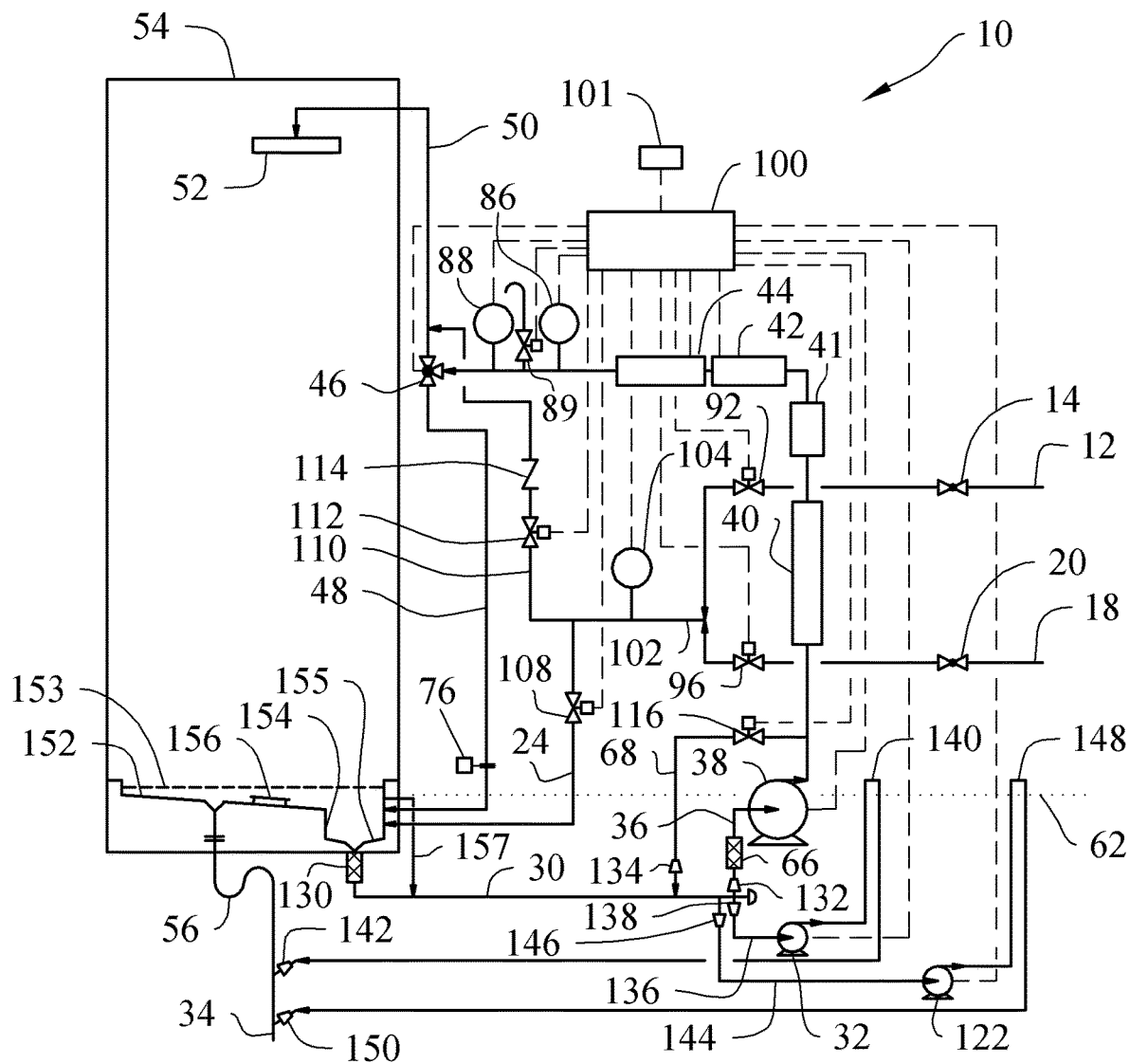
FIG. 5 is a schematic view of an alternate electronically controllable embodiment of the electronically controllable water recycling system of the present invention with a tank integrated in the base of the shower or bathtub.

In FIG. 5, an electronically controllable embodiment of the water recycling system and method 10 of the present invention is illustrated and will be described. More particularly, this embodiment of the water recycling system 10 includes the hot water line 12, the cold water line 18, at least one recirculation loop in communication with a tank 154 and the shower 54, and the controller 100 in connection with the power supply 101.

The hot water line 12 can include the hot water shut off valve 14 upstream of the hot water valve 92. The cold water line 18 can include the cold water shut off valve 20 upstream of the cold water valve 96. The hot water line 12 and the cold water line 18 combine into the merge line 102 downstream of the control valves 92, 96. The merge line 102 is in communication with the shower line 50 downstream of the shower valve 46 via the by-pass line 110. The merge line 102 can include the temperature sensing device 104 in communication with the controller 100. The by-pass line 110 can include the shower input line valve 112 in communication with and controllable by the controller 100, and the check valve 114. The shower input line valve 112 can be downstream of the temperature sensing device 104, and the check valve 114 can be downstream of the shower input line valve 112. The hot water valve 92, the cold water valve 96 and the shower input line valve 112 are in communication with and can be controlled by the controller 100.

The first tank input line 24 is in communication with the interior of the tank 154 and the merge line 102. The first tank input line 24 can optionally include an optional valve 108 in communication with and can be controlled by the controller 100. The first tank input line 24 can be in communication with the merge line 102 between the temperature sensing device 104 and the shower input line valve 112.

The shower 54 can include a shower floor 153, a shower subfloor 152 positioned below the shower floor 153, and an overflow line 157 in communication with the tank drain line 30. The shower floor 153 is configured to support a user standing thereon and can include perforations allowing liquid to drain to the shower subfloor 152. The shower subfloor 152 can include at least a portion thereof sloping toward a drain and the tank 154. The shower floor 153 can have a peripheral edge that retains a predetermined level of water, and the shower subfloor 152 can include an access panel 156. The tank 154 can be any enclosed or partially enclosed container that is built in to a base of the shower 54 and which is in communication with the subfloor floor 152 and/or water level. The tank 154 can include a sloping subfloor surface 155 angled toward the tank drain line 30. The tank drain line 30 can be sloped at an angle of around 1°-10°, with an angle of around 5° being adequate, and can include a filter 130. The tank drain line 30 can also include an end cap that allows for additional pluming or systems to be connected thereto.

A first tank drain line 136 can be included which is in communication with the tank drain line 30 via an optional reducer/expander 138 and the drain pump 32 which outputs to the drain line 34 via an optional reducer/expander 142. The first tank drain line 136 includes a seal leg 140 with a section higher than the tank elevation 62. The drain pump 32 can be in communication with and can be controlled by the controller 100.

A second tank drain line 144 can be included which is in communication with the tank drain line 30 via an optional reducer/expander 146 and the second drain pump 122 which outputs to the drain line 34 via an optional reducer/expander 150. The second drain pump 122 outputs to a second seal leg 148 with a section higher than the tank elevation 62. The second tank drain line 144 and second drain pump 122 can be utilized as a backup drain system upon failure of the drain pump 32 and/or clogging of the first tank drain line 136. The second drain pump 122 can be in communication with and can be controlled by the controller 100.

The tank output line 36 is in communication with the tank drain line 30 via an optional reducer/expander 132 and the circulation pump 38. The circulation pump 38 can be in communication with and can be controlled by the controller 100. The filter 66 is associated with the tank output line 36 upstream of the circulation pump 38. The circulation pump 38 outputs to the filter 40.

The tank output line 36 continues downstream of the filter 40 to the additional liquid treatment units, such as but not limited to, the 1 μm filter 41, the UV system 42 and the heater 44, and then to the shower valve 46. The UV system 42, the heater 44 and the shower valve 46 are in communication with and can be controlled by the controller 100, wherein the shower valve 46 may also include a position/limit switch in communication with the controller 100. The pressure sensing device 86 and the temperature sensing device 88 are in communication with the tank output line 36 downstream of the heater 44 and upstream of the shower valve 46. The pressure sensing device 86 and the temperature sensing device 88 are in communication with the controller 100. Additionally, the vent valve 89 can be in communication with the tank output line 36 upstream of the shower valve 46. The vent valve 89 is in communication with and may be controlled by the controller 100.

The second tank input line 48 communicates with an output of the shower valve 46 to the interior of the tank 154 to create the first recirculation loop. The second tank input line 48 can include the restricted orifice 76, which can be a fixed or variable orifice, and which additionally can be in communication with and controlled by the controller 100.

The third tank input line 68 communicates the output line of the circulation pump 38 to the tank drain line 30 via an optional reducer/expander 134, thereby creating a return loop. The third tank input line 68 can also include the valve 116 in communication with and may optionally be controlled by the controller 100.

The shower line 50 communicates an output of the shower valve 46 to the shower head 52. The shower drain line 56 is coupled to the shower drain of the shower floor 152 via a union, with the shower drain line 56 being in communication with the drain line 34. The shower drain line 56 can include a trap upstream of the optional reducer/expander 142 and/or the optional reducer/expander 150.

The first recirculation loop can be envisioned from the tank 154 to the tank drain line 30, to tank output line 36, to the shower valve 46, and then back to the tank 154 via the second tank input line 48.

The second recirculation loop can be envisioned from the tank 154 to the tank drain line 30, to tank output line 36, to the shower valve 46, to the shower line 50, to the shower 54, and then back to the tank 154 via draining from the shower floor 153.

The third recirculation loop can be envisioned from the tank drain line 30, to the tank output line 36, to the third tank input line 68, and then back to the tank drain line 30.

It can be appreciated that the water recycling system 10 of FIG. 5 can be a retrofittable unit that attaches to an existing shower/bath plumbing system which includes the hot water line 12 and cold water line 18, and their corresponding shut off valves 14, 20 and dosing valves 16, 22. The water recycling system 10 of FIG. 5, or portions thereof, can be retrofitted to existing shower/bath systems to create a recirculation loop between the shower line 50 and the tank drain line 30. It can also be appreciated that the water recycling system 10 of FIG. 5 can be a modular and/or self-contained unit integrally incorporated with a shower or bathtub, thereby simplifying installation and/or manufacture.

Figure 6:
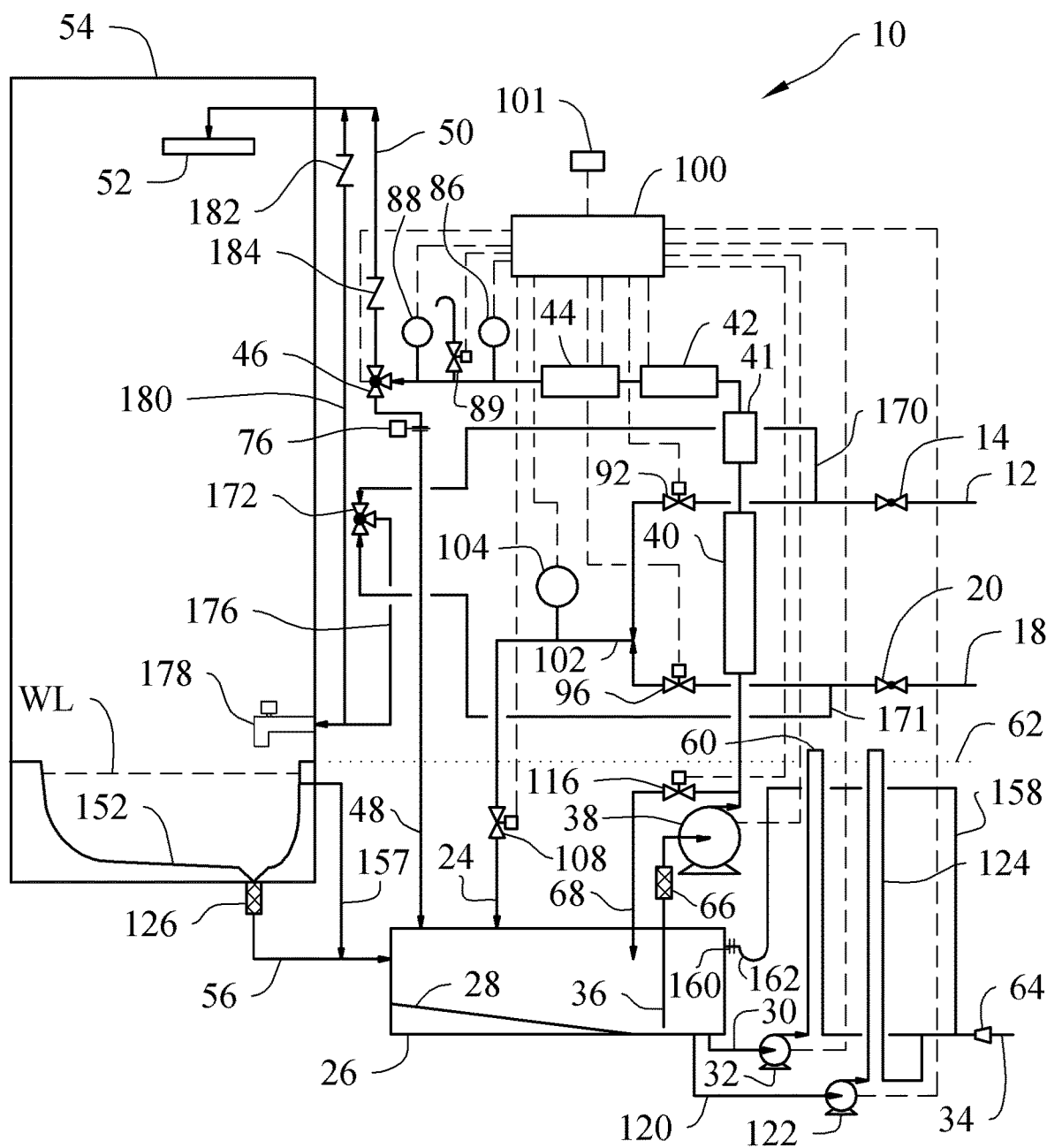
FIG. 6 is a schematic view of an alternate embodiment of the electronically controllable water recycling system of the present invention with a bath and independent tank option.

In FIG. 6, an electronically controllable embodiment of the water recycling system and method 10 of the present invention is illustrated and will be described. More particularly, this embodiment of the water recycling system 10 includes the hot water line 12, the cold water line 18, at least one recirculation loop in communication with a tank 26 and the shower 54, and the controller 100 in connection with the power supply 101.

The hot water line 12 can include the hot water shut off valve 14 upstream of the hot water valve 92. The cold water line 18 can include the cold water shut off valve 20 upstream of the cold water valve 96. The hot water line 12 and the cold water line 18 combine into the merge line 102 downstream of the control valves 92, 96. The merge line 102 can include the temperature sensing device 104 in communication with the controller 100. The hot water valve 92, the cold water valve 96 and the optional valve 108 are in communication with and can be controlled by the controller 100.

In this embodiment, the merge line 102 and the first tank input line 24 are essentially the same line, which is in communication with the interior of the tank 154 and which can include the optional valve 108 in communication with and can be controlled by the controller 100.

The hot water line 12 can include a hot water by-pass line 170 in communication with the hot water line 12 upstream of the hot water valve 92. The cold water line 18 can include a cold water by-pass line 171 in communication with the cold water line 18 upstream of the cold water valve 96. The hot and cold water by-pass lines 170, 171 are in communication with a faucet valve 172. A faucet valve line 176 in communication with an output of the faucet valve 172 and with a faucet 178 associated with the shower 54. It can be appreciated that the system 10 of FIG. 6 can be used with a shower pan or basin without the faucet valve line 176 and faucet 178.

The shower 54 can include the shower subfloor 152 with a least a portion thereof sloping toward a drain, raised walls to retain a predetermined water level WL, and a bath overflow line 157 in communication with the shower drain line 56. The shower drain line 56 is in communication with the drain and can include the filter 126, with a sloped horizontal section at an angle around 1°-10°, with an angle of around 5° being adequate. The angle is configured to allow liquid to gravity drain toward the tank 26. It can be appreciated that the filter 126 can optionally be associated with a drain of the shower 54.

The tank 26 can be any enclosed or partially enclosed container, and can include the sloping floor surface 28. The floor surface 28 slopes toward the tank drain line 30 at an angle around 1°-10°, with an angle of around 5° being adequate. The tank drain line 30 is in communication with the drain pump 32 which outputs to the drain line 34. The drain line 34 includes the seal leg 60 with a section higher than the tank elevation 62. The drain line 34 can further include the optional reducer/expander 64 located downstream of the seal leg 60.

The second tank drain line 120 can be included which is in communication with the tank 26 and the second drain pump 122. The second drain pump 122 outputs to the second seal leg 124 with a section higher than the tank elevation 62. The second seal leg 124 is in communication with the drain line 34 upstream of the optional reducer/expander 64. The second drain line 120 and second drain pump 122 can be utilized as a backup drain system upon failure of the drain pump 32 and/or clogging of the tank drain line 30. The drain pumps 32, 122 can be in communication with and can be controlled by the controller 100.

A tank overflow line 158 can be included which is in communication with the tank 26 and the drain line 34. The overflow line 158 can be coupled to the tank via a union 160, and can also include a trap 162. An inlet of the overflow line 158 can be located higher than an inlet for the first and second tank drain lines 30, 120 but lower than an inlet of the overflow line 157 to transfer any overflow to the drain line 34.

The tank output line 36 is in communication with the interior of the tank 26 and the circulation pump 38. The circulation pump 38 can be in communication with and can be controlled by the controller 100. The filter 66 is associated with the tank output line 36 upstream of the circulation pump 38. The circulation pump 38 outputs to the filter 40.

The tank output line 36 continues downstream of the filter 40 to the additional liquid treatment units, such as but not limited to, the 1 μm filter 41, the UV system 42 and the heater 44, and then to the shower valve 46. The UV system 42, the heater 44 and the shower valve 46 are in communication with and can be controlled by the controller 100. The pressure sensing device 86 and the temperature sensing device 88 are in communication with the tank output line 36 downstream of the heater 44 and upstream of the shower valve 46. The pressure sensing device 86 and the temperature sensing device 88 are in communication with the controller 100. Additionally, the vent valve 89 can be in communication with the tank output line 36 upstream of the shower valve 46. The vent valve 89 is in communication with and may be controlled by the controller 100.

The second tank input line 48 communicates with an output of the shower valve 46 to the interior of the tank 26 to create the first recirculation loop. The second tank input line 48 can include the restricted orifice 76, which can be a fixed or variable orifice, and which additionally can be in communication with and controlled by the controller 100.

The third tank input line 68 is in communication with the interior of the tank 26 and the output line of the circulation pump 38 upstream of the filter 40, thereby creating a return loop. The third tank input line 68 can also include a valve 116 in communication with and can be controlled by the controller 100.

The shower line 50 communicates an output of the shower valve 46 to the shower head 52. The shower line 50 can include a check valve 184.

A shower line by-pass line 180 is in communication with the faucet valve line 176 and the shower line 50. The shower line by-pass line 180 can include a check valve 182.

The first recirculation loop can be envisioned from the tank 26 to the tank output line 36, to the shower valve 46, and then back to the tank 26 via the second tank input line 48.

The second recirculation loop can be envisioned from the tank 26 to the tank output line 36, to the shower valve 46, to the shower line 50, to the shower 54, and then back to the tank 26 via the shower drain line 56.

The third recirculation loop can be envisioned from the tank 26 to the tank output line 36, to the third tank input line 68, and then back to the tank 26.

It can be appreciated that the water recycling system 10 of FIG. 6 can be a retrofittable unit that attaches to an existing shower/bath plumbing system which includes the hot water line 12 and cold water line 18, and their corresponding shut off valves 14, 20 and dosing valves 16, 22. The water recycling system 10 of FIG. 6 could be retrofitted to existing shower/bath systems to create a recirculation loop between the shower line 50 and the tank drain line 30. It can also be appreciated that the water recycling system 10 of FIG. 6 can be a modular and/or self-contained unit integrally incorporated with a shower or bathtub, thereby simplifying installation and/or manufacture.

Figure 7:
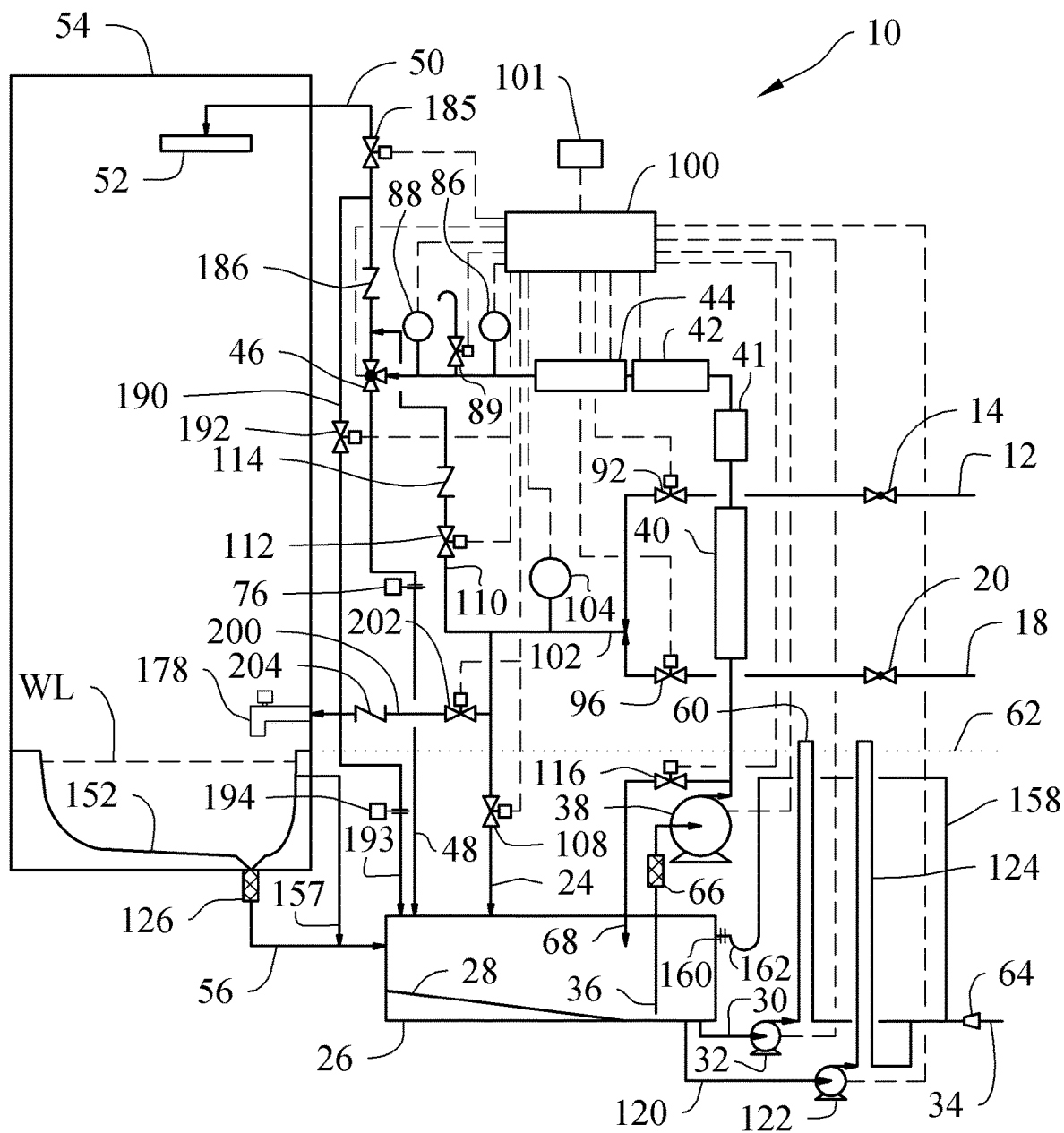
FIG. 7 is a schematic view of an alternate embodiment of the electronically controllable water recycling system of the present invention with a bath and independent tank option.

In FIG. 7, an electronically controllable embodiment of the water recycling system and method 10 of the present invention is illustrated and will be described. More particularly, this embodiment of the water recycling system 10 includes the hot water line 12, the cold water line 18, at least one recirculation loop in communication with a tank 26 and the shower 54, and the controller 100 in connection with the power supply 101.

The hot water line 12 can include the hot water shut off valve 14 upstream of a hot water valve 92. The cold water line 18 can include the cold water shut off valve 20 upstream of a cold water valve 96. The hot water line 12 and the cold water line 18 combine into the merge line 102 downstream of the control valves 92, 96. The merge line 102 is in communication with the shower line 50 downstream of the shower valve 46 via the by-pass line 110. The merge line 102 can include the temperature sensing device 104 in communication with the controller 100. The merge line 102 can include the shower input line valve 112 in communication with and controllable by the controller 100, and the check valve 114. The shower input line valve 112 can be downstream of the temperature sensing device 104, and the check valve 114 can be downstream of the shower input line valve 112. The hot water valve 92, the cold water valve 96 and the shower input line valve 112 are in communication with and can be controlled by the controller 100.

The first tank input line 24 is in communication with the interior of the tank 26 and the merge line 102. The first tank input line 24 can include the optional valve 108 in communication with and can be controlled by the controller 100. The first tank input line 24 can be in communication with the merge line 102 between the temperature sensing device 104 and the shower input line valve 112.

A faucet line 200 can be in communication with the first tank input line 24 upstream of the optional valve 108. The faucet line 200 can include a faucet valve 202 and a check valve 204, and outputs to a faucet 178 associated with the shower 54. It can be appreciated that the system 10 of FIG. 7 can be used with a shower pan or basin without the faucet line 200 and faucet 178.

The shower 54 can include the shower floor 152 with a least a portion thereof sloping toward a drain, raised walls to retain a predetermined water level WL, and the overflow line 157 in communication with the shower drain line 56. The shower drain line 56 is in communication with the drain and can include the filter 126, with a sloped horizontal section at an angle around 1°-10°, with an angle of around 5° being adequate. The angle is configured to allow liquid to gravity drain toward the tank 26. It can be appreciated that the filter 126 can optionally be associated with a drain of the shower 54.

The tank 26 can be any enclosed or partially enclosed container, and can include the sloping floor surface 28. The floor surface 28 slopes toward the tank drain line 30 at an angle around 1°-10°, with an angle of around 5° being adequate. The tank drain line 30 is in communication with the drain pump 32 which outputs to the drain line 34. The drain line 34 includes the seal leg 60 with a section higher than the tank elevation 62. The drain line 34 can further include the optional reducer/expander 64 located downstream of the seal leg 60.

The second tank drain line 120 can be included which is in communication with the tank 26 and the second drain pump 122. The second drain pump 122 outputs to the second seal leg 124 with a section higher than the tank elevation 62. The second seal leg 124 is in communication with the drain line 34 upstream of the optional reducer/expander 64. The second drain line 120 and second drain pump 122 can be utilized as a backup drain system upon failure of the drain pump 32 and/or clogging of the tank drain line 30. The drain pumps 32, 122 can be in communication with and can be controlled by the controller 100.

A tank overflow line 158 can be included which is in communication with the tank 26 and the drain line 34. The overflow line 158 can be coupled to the tank via a union 160, and can also include a trap 162. An inlet of the overflow line 158 can be located higher than an inlet for the first tank drain line 30 but lower than an inlet of the overflow line 157 to transfer any overflow to the drain line 34.

The tank output line 36 is in communication with the interior of the tank 26 and the circulation pump 38. The circulation pump 38 can be in communication with and can be controlled by the controller 100. The filter 66 is associated with the tank output line 36 upstream of the circulation pump 38. The circulation pump 38 outputs to the filter 40.

The tank output line 36 continues downstream of the filter 40 to the additional liquid treatment units, such as but not limited to, the 1 μm filter 41, the UV system 42 and the heater 44, and then to the shower valve 46. The UV system 42, the heater 44 and the shower valve 46 are in communication with and can be controlled by the controller 100. The pressure sensing device 86 and the temperature sensing device 88 are in communication with the tank output line 36 downstream of the heater 44 and upstream of the shower valve 46. The pressure sensing device 86 and the temperature sensing device 88 are in communication with the controller 100. Additionally, the vent valve 89 can be in communication with the tank output line 36 upstream of the shower valve 46. The vent valve 89 is in communication with and may be controlled by the controller 100.

The second tank input line 48 communicates with an output of the shower valve 46 to the interior of the tank 26 to create the first recirculation loop. The second tank input line 48 can include the restricted orifice 76, which can be a fixed or variable orifice, and which additionally can be in communication with and controlled by the controller 100.

The third tank input line 68 is in communication with the interior of the tank 26 and the output line of the circulation pump 38 upstream of the filter 40, thereby creating a return loop. The third tank input line 68 can also include the valve 116 in communication with and can be controlled by the controller 100.

The shower line 50 communicates an output of the shower valve 46 to the shower head 52. The shower line 50 can include a shower line valve 185, and a check valve 186. The shower line valve can be in communication with and can be controlled by the controller 100.

A second by-pass line 190 can be in communication with the faucet line 200 and the shower line 50. The second by-pass line 190 can include a valve 192 in communication with and can be controlled by the controller 100. A fourth tank input line 193 can be in communication with the faucet line 200 and the tank 26. The fourth tank input line 193 can include a restricted orifice 194, which can be a fixed or variable orifice, and which additionally can be in communication with and controlled by the controller 100.

The first recirculation loop can be envisioned from the tank 26 to the tank output line 36, to the shower valve 46, and then back to the tank 26 via the second tank input line 48.

The second recirculation loop can be envisioned from the tank 26 to the tank output line 36, to the shower valve 46, to the shower line 50, to the shower 54, and then back to the tank 26 via the shower drain line 56.

The third recirculation loop can be envisioned from the tank 26 to the tank output line 36, to the third tank input line 68, and then back to the tank 26.

A possible fourth recirculation loop can be envisioned from the tank 26 to the tank output line 36, to the shower valve 46, to the shower line 50, to the second by-pass line 190, to the faucet 178, and then back to the tank 26 via the shower drain line 56.

A possible fifth recirculation loop can be envisioned from the tank 26 to the tank output line 36, to the shower valve 46, to the shower line 50, to the fourth tank input line 193, and then back to the tank 26.

It can be appreciated that the water recycling system 10 of FIG. 7 can be a retrofittable unit that attaches to an existing shower/bath plumbing system which includes the hot water line 12 and cold water line 18, and their corresponding shut off valves 14, 20 and dosing valves 16, 22. The water recycling system 10 of FIG. 7 could be retrofitted to existing shower/bath systems to create a recirculation loop between the shower line 50 and the tank drain line 30. It can also be appreciated that the water recycling system 10 of FIG. 7 can be a modular and/or self-contained unit integrally incorporated with a shower or bathtub, thereby simplifying installation and/or manufacture.

Figure 8:
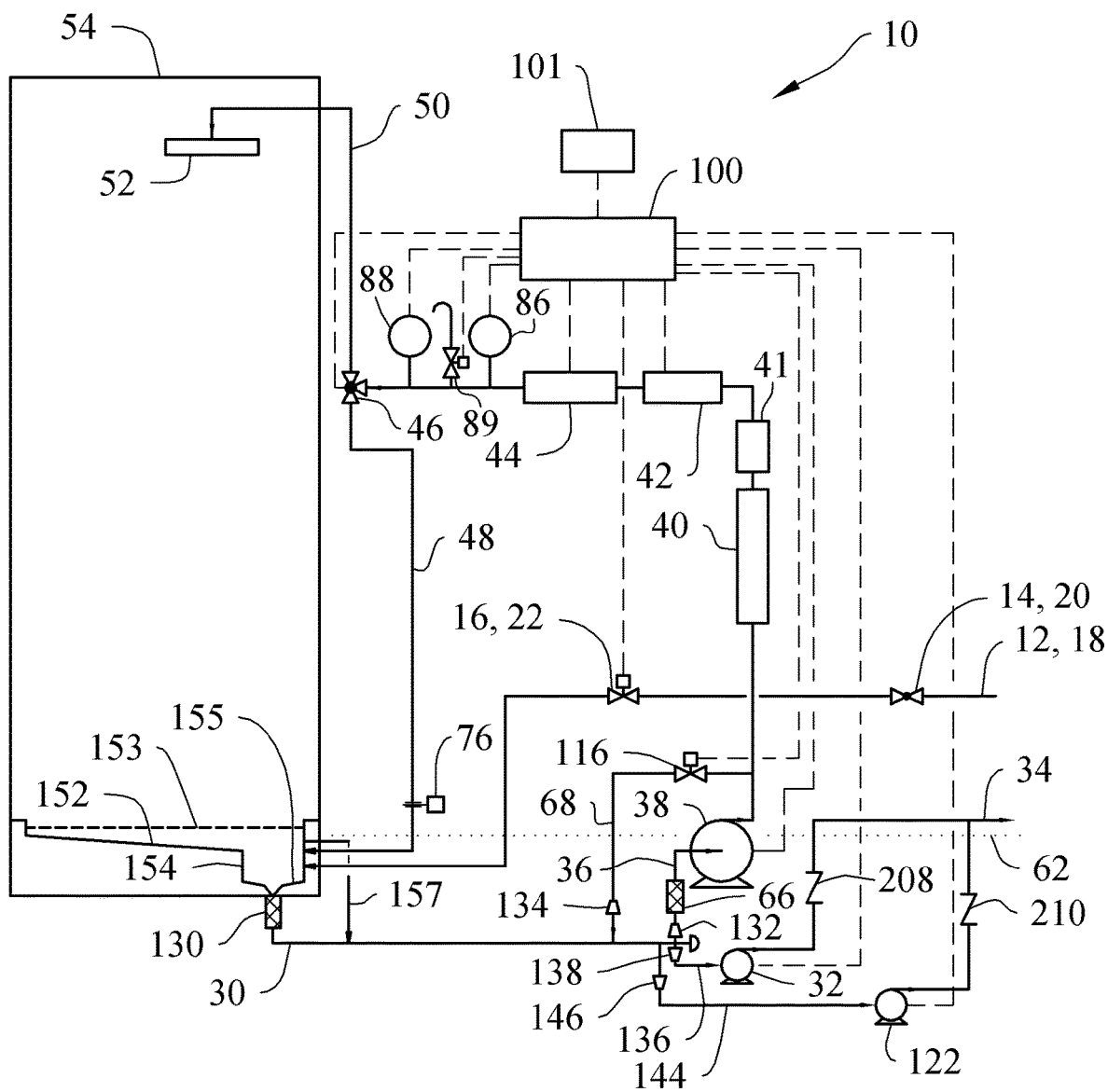
FIG. 8 is a schematic view of an alternate embodiment of the electronically controllable water recycling system of the present invention with a tank integrated in the base of the shower or bathtub.

In FIG. 8, an electronically controllable embodiment of the water recycling system and method 10 of the present invention is illustrated and will be described. More particularly, this embodiment of the water recycling system 10 includes a hot and/or cold water line 12, 18 in communication with a hot and/or cold water source, at least one recirculation loop in communication with a tank 154 and the shower 54, and the controller 100 in connection with the power supply 101.

The water line 12, 18 can include the water shut off valve 14, 20, and at least one dosing valve 16, 22. The dosing valve 16, 22 can be in series or in parallel with the water shut off valve 14, 20. The water line 12, 18 outputs into the tank 154.

In this embodiment, the first tank input line 24 is not required.

The shower 54 can include the shower floor 153, the shower subfloor 152 positioned below the shower floor 153, raised walls to retain a predetermined water level, and the overflow line 157 in communication with the drain line 30 or the atmosphere exterior of the shower 54. The shower floor 153 is configured to support a user standing thereon and can include perforations allowing liquid to drain to the shower subfloor 152. The shower subfloor 152 can include at least a portion thereof sloping toward a drain and the tank 154. The shower floor 153 can have a peripheral edge that retains a predetermined water level. The tank 154 can be any enclosed or partially enclosed container that is built in to a base of the shower 54 and which is in communication with the subfloor floor 152 and/or water level. The tank 154 can include a sloping subfloor surface 155 angled toward the tank drain line 30. The tank drain line 30 can be sloped at an angle of around 1°-10°, with an angle of around 5° being adequate, and can include the filter 130. The tank drain line 30 can also include an end cap that allows for additional pluming or systems to be connected thereto.

The first tank drain line 136 can be included which is in communication with the tank drain line 30 via the optional reducer/expander 138 and the drain pump 32, which outputs to the drain line 34 via a check valve 208. The first tank drain line 136 includes a section downstream of the check valve 208 that is higher than the tank elevation 62. The drain pump 32 can be in communication with and can be controlled by the controller 100. Furthermore, the drain line 34 can be higher than the tank elevation 62, and can output or be in communication with a sewage system or treatment system (not shown).

The second tank drain line 144 can be included which is in communication with the tank drain line 30 via the optional reducer/expander 146 and the second drain pump 122, which outputs to the drain line 34 via a check valve 210. The second tank drain line 144 includes a section downstream of the check valve 210 that is higher than the tank elevation 62. The second tank drain line 144 and second drain pump 122 can be utilized as a backup drain system upon failure of the drain pump 32 and/or clogging of the first tank drain line 136. The second drain pump 122 can be in communication with and can be controlled by the controller 100.

The tank output line 36 is in communication with the tank drain line 30 via the optional reducer/expander 132 and the circulation pump 38. The circulation pump 38 can be in communication with and can be controlled by the controller 100. The filter 66 is associated with the tank output line 36 upstream of the circulation pump 38. The circulation pump 38 outputs to the filter 40.

The tank output line 36 continues downstream of the filter 40 to the additional liquid treatment units, such as but not limited to, the 1 μm filter 41, the UV system 42 and the heater 44, and then to the shower valve 46. The UV system 42, the heater 44 and the shower valve 46 are in communication with and can be controlled by the controller 100. The pressure sensing device 86 and the temperature sensing device 88 are in communication with the tank output line 36 downstream of the heater 44 and upstream of the shower valve 46. The pressure sensing device 86 and the temperature sensing device 88 are in communication with the controller 100. Additionally, the vent valve 89 can be in communication with the tank output line 36 upstream of the shower valve 46. The vent valve 89 is in communication with and may be controlled by the controller 100.

The second tank input line 48 communicates with an output of the shower valve 46 to the interior of the tank 154 to create the first recirculation loop. The second tank input line 48 can include the restricted orifice 76, which can be a fixed or variable orifice, and which additionally can be in communication with and controlled by the controller 100.

The third tank input line 68 communicates the output line of the circulation pump 38 to the tank drain line 30 via an optional reducer/expander 134, thereby creating a return loop. The third tank input line 68 can also include the valve 116 in communication with and can be controlled by the controller 100.

The shower line 50 communicates an output of the shower valve 46 to the shower head 52.

The first recirculation loop can be envisioned from the tank 154 to the tank drain line 30, to tank output line 36, to the shower valve 46, and then back to the tank 154 via the second tank input line 48.

The second recirculation loop can be envisioned from the tank 154 to the tank drain line 30, to tank output line 36, to the shower valve 46, to the shower line 50, to the shower 54, and then back to the tank 154 via draining from the shower floor 153.

The third recirculation loop can be envisioned from the tank drain line 30, to the tank output line 36, to the third tank input line 68, and then back to the tank drain line 30.

It can be appreciated that the water recycling system 10 of FIG. 8 can be a retrofittable unit that attaches to an existing shower/bath plumbing system which includes the hot water line 12 and cold water line 18, and their corresponding shut off valves 14, 20 and dosing valves 16, 22. The water recycling system 10 of FIG. 8 could be retrofitted to existing shower/bath systems to create a recirculation loop between the shower line 50 and the tank drain line 30. It can also be appreciated that the water recycling system 10 of FIG. 8 can be a modular and/or self-contained unit integrally incorporated with a shower or bathtub, thereby simplifying installation and/or manufacture.

Figure 9:
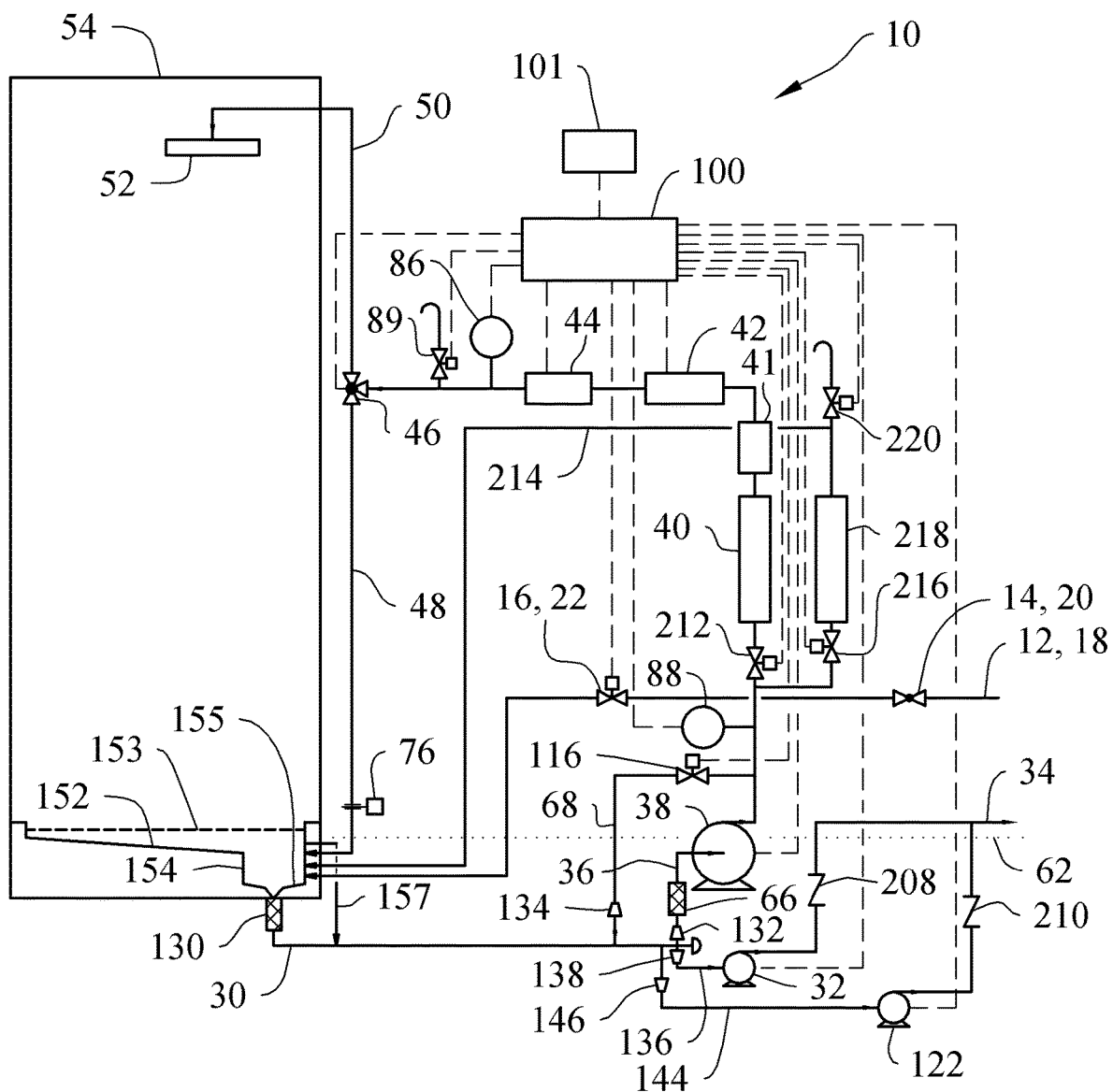
FIG. 9 is a schematic view of an alternate embodiment of the electronically controllable water recycling system of the present invention with a solar water heater.

In FIG. 9, an electronically controllable embodiment of the water recycling system and method 10 of the present invention is illustrated and will be described. More particularly, this embodiment of the water recycling system 10 includes all the element of the embodiment described in FIG. 8, with the additional inclusion of a tank output line valve 212, a solar line 214, and a solar water heating system 218, and a vent valve 220 in communication with the solar line 214 downstream of the solar heating system 218.

The tank output line 36 includes the tank output line valve 212 upstream of the filter 40, with the tank output line valve 212 being in communication with and can be controlled by the controller 100.

The solar line 214 is in communication with the tank output line 36 upstream of the tank output line valve 212. The solar line 214 includes a solar line valve 216 in communication with and can be controlled by the controller 100, and a solar water heating system 218. The solar line 214 is in communication with and outputs into the tank 154. The solar water heating system 218 can be, but not limited to, a direct or indirect solar heat system, a geothermal heating system, or an electrical heater powered in part by photovoltaic cells.

The temperature sensing device 88 is in communication with the tank output line 36 downstream where the third tank input line 68 connects with the output line of the circulation pump 38, and upstream of the solar line valve 216.

The first recirculation loop can be envisioned from the tank 154 to the tank drain line 30, to tank output line 36, to the shower valve 46, and then back to the tank 154 via the second tank input line 48.

The second recirculation loop can be envisioned from the tank 154 to the tank drain line 30, to tank output line 36, to the shower valve 46, to the shower line 50, to the shower 54, and then back to the tank 154 via draining from the shower floor 153.

The third recirculation loop can be envisioned from the tank drain line 30, to the tank output line 36, to the third tank input line 68, and then back to the tank drain line 30.

A possible fourth recirculation loop can be envisioned from the tank 154 to the solar line 214 via the tank output line 36, and from the solar line 214 back to the tank 154.

It can be appreciated that the water recycling system 10 of FIG. 9 can be a retrofittable unit that attaches to an existing shower/bath plumbing system which includes the hot water line 12 and cold water line 18, and their corresponding shut off valves 14, 20 and dosing valves 16, 22. The water recycling system 10 of FIG. 9 could be retrofitted to existing shower/bath systems to create a recirculation loop between the shower line 50 and the tank drain line 30. It can also be appreciated that the water recycling system 10 of FIG. 9 can be a modular and/or self-contained unit integrally incorporated with a shower or bathtub, thereby simplifying installation and/or manufacture.

Figure 10:
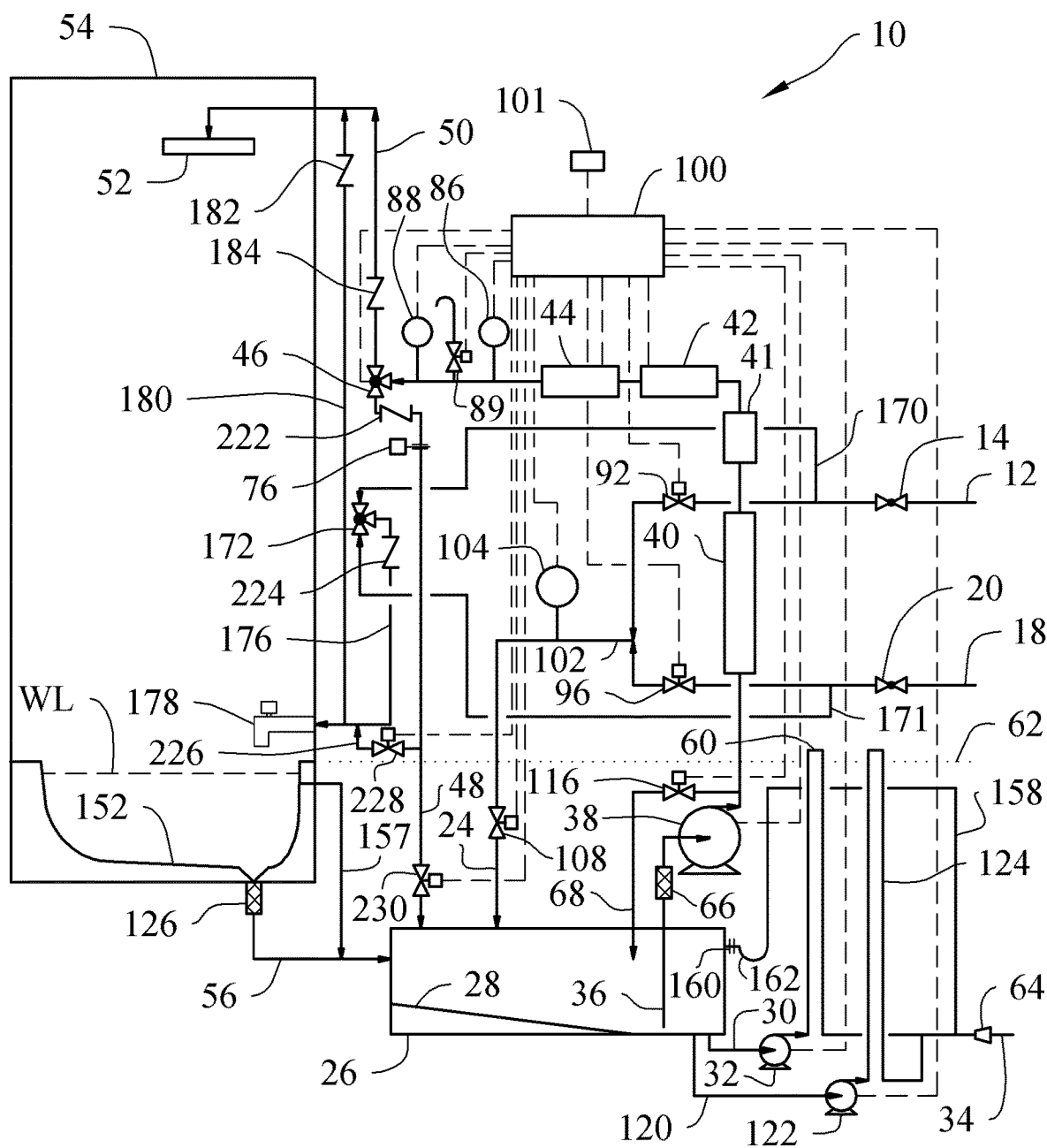
FIG. 10 is a schematic view of an alternate embodiment of the electronically controllable water recycling system of the present invention with a bath and independent tank option.

In FIG. 10, an electronically controllable embodiment of the water recycling system and method 10 of the present invention is illustrated and will be described. More particularly, this embodiment of the water recycling system 10 includes all the element of the embodiment described in FIG. 6, with the additional inclusion of: a check valve 222 between the shower valve and the restricted orifice 76; a check valve 224 with the faucet valve line 176 downstream of the faucet valve 172; a by-pass line 226 with a by-pass valve 228; and a second tank input line valve 230 with the second tank input line 48. The by-pass line 226 connects the second tank input line 48 to the faucet valve line 176. The second tank input line valve 230 is located downstream of by-pass line 226. The by-pass valve 228 and the second tank input line 230 can be in communication with and can be controlled by the controller 100.

The first recirculation loop can be envisioned from the tank 26 to the tank output line 36, to the shower valve 46, and then back to the tank 26 via the second tank input line 48.

The second recirculation loop can be envisioned from the tank 26 to the tank output line 36, to the shower valve 46, to the shower line 50, to the shower 54, and then back to the tank 26 via the shower drain line 56.

The third recirculation loop can be envisioned from the tank 26 to the tank output line 36, to the third tank input line 68, and then back to the tank 26.

A possible fourth recirculation loop can be envisioned from the tank 26 to the tank output line 36, to the shower valve 46, to the second tank input line 48, to the by-pass line 226, to the faucet valve line 176, to the shower 54, and then back to the tank 26 via the shower drain line 56.

A possible fifth recirculation loop can be envisioned from the tank 26 to the tank output line 36, to the shower valve 46, to the second tank input line 48, to the by-pass line 226, to the shower line by-pass line 180, to the shower line 50, to the shower 54, and then back to the tank 26 via the shower drain line 56.

In use, it can now be understood that a user can operate and control the water recycling system 10 of FIGS. 4-10 by way of an interface associated and in communication with the controller 100. The user can provide all desired information to the controller 100 via a control panel, switches and/or any suitable interface. The controller 100 can control operations of all valves and pumps communicating therewith, and it can be appreciated that all valves and pumps can be manually actuated and/or controlled.

For example, a user could but not limited: schedule initial operation of the shower for predetermined times and/or days; select water temperature with an accuracy of less than 1° C.; monitor water and gas or electric usage; and/or remind the user for any maintenance job.

The controller 100 can be installed in a wall near the shower, in a ceiling above the shower, in a floor below the shower or integrated with the shower stall. The user can control the water recycling system 10 of FIG. 4-10 using an application, program or interface stored on or accessed by an electronic device, such as any portable electronic device, computer, laptop, smartphone and the like. The electronic device can communicate with the controller 100 using Wi-Fi, Bluetooth, radio and any suitable wired or wireless systems.

If the user is unable to communicate with the controller 100, as a backup, the user is still capable of having a shower. This can be accomplished by rotating twice the shower valve 46 manually, which directs water to the shower head 52 and/or back to the tank 26, 154. The user would preset a default temperature, and a position switch associated with the controller prepares the shower at the preset temperature. Thereby allowing the user to always be able to have a shower.

For exemplary use, the user could initiate pre-shower operations by using a smartphone via the application. The user can be asked if the user wants another temperature than the default one. After which, the hot and/or cold water valves 16, 22, 92, 96 are operated until the desired water temperature is reached. This portion can be controllable by the temperature sensing device 104, and can be designed to take about 1 minute. After which the shower is ready with a desired water temperature recirculating from the tank 26, 154 and through the heater 44. During this time, the user could get undressed and then initiate a shower operation via the smartphone application.

Upon initiating shower operation, the shower valve 46 can be operated by the controller 100 or manually so that water is dispensed from the shower head 52.

The user can then optionally close the shower valve 46 via the controller 100 or manually, thereby providing an opportunity to apply soap while saving water. During this time, the water temperature can be maintained by recirculating the water from the tank 26, 154 and through the heater 44. After which, the user opens the shower valve 46 to directed the recirculating water to the shower head 52 allowing the user to rinse off. The user can always adjust the temperature of the water by using the smartphone application or manually.

When the user has finished showering and is out of the shower 54, the user can stop the shower operation using the smartphone application.

It can be appreciated that the circulation pump 38 pumps water from the tank 26, 154 through the filter 40, the 1 µm filter 41, the UV system 42 and the heater 44 and then to the shower valve 46. The temperature sensing device 88 provides a signal to the controller 100 to control operation of the heater 44 to heat the water to a desired temperature. The shower valve 46 can direct the water to the shower head 52 and/or back to the tank 26, 154. Water draining from the shower 54 is inputted into the tank 26, 154.

It can be appreciated that the circulation pump 38 can recirculate water from the tank 26, 154 through the filter 40, the 1 µm filter 41, the UV system 42 and the heater 44 to the shower 54, and then back to the tank 26, 154 so as to elevate and/or maintain the water at the predetermined temperature while reducing overall water use. The circulation pump 38 can also recirculate water from the tank 26, 154 to the shower 54, thereby further reducing overall water use.

Upon a power failure or if the circulation pump 38 fails to operate, water can still be provided to the shower head 52 via the by-pass line 110, 176, 180. The water in the tank 26 can be drained by the drain pump 32 and/or second drain pump 122, with the seal legs 60 and 124 providing anti-backflow or anti-siphon features.

It can also be appreciated that the filter 40, the 1 µm filter 41 and the UV system 42 provide a cleaning, filtering and/or sanitary operation of water from the tank 26, 154.

While embodiments of the water recycling system and method have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although purification, reclamation and reuse of grey water for domestic or industrial uses have been described, it should be appreciated that the water recycling system and method herein described is also suitable for recycling any fluid while maintaining the fluid at a predetermined temperature.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A liquid circulating system comprising:
   at least one tank configured to receive liquid from a liquid usage device that is in communication with a liquid input line by way of a usage device drain line coupled to said liquid usage device and said at least one tank, and to receive the liquid by way of a first tank input line directly coupled to said at least one tank and to said liquid input line between a liquid input line valve and said liquid usage device to by-pass said liquid usage device;

at least one tank by-pass line directly coupled with said first tank input line prior to said at least one tank, and directly coupled to a usage device line that provides the liquid to said liquid usage device, said at least one tank by-pass line is configured to receive the liquid from said first tank input line prior to entering said at least one tank and provide the liquid to said liquid usage device line;

at least one circulation pump configured to pump the liquid from said at least one tank;

at least one filter in communication with an output of said at least one circulation pump by way of a tank output line;

at least one heater associated with said tank output line; and a three-way valve having an input directly coupled with said tank output line to receive an output from said heater, a first output configured to direct the liquid from said heater to said liquid usage device, and a second output configured to direct the liquid from said heater to said at least one tank.

2. The liquid circulating system according to claim 1, wherein said at least one filter includes a first geotextile element associated with a filter input side, a quartz element downstream of said first geotextile element, an activated carbon element downstream of said first geotextile element, and a second geotextile element downstream of said activated carbon element.

3. The liquid circulating system according to claim 1 further comprises a ultra-violet system associated with said tank output line.

4. The liquid circulating system according to claim 1, wherein said at least one tank by-pass line is coupled to said first tank input line between said liquid input line valve and a first input line shut off valve.

5. The liquid circulating system according to claim 4, wherein said at least one tank by-pass line receives the liquid from said liquid input line upstream of said three-way valve, and said at least one tank by-pass line is coupled to said usage device line downstream of said three-way valve.

6. The liquid circulating system according to claim 1 further comprises a drain pump in communication with said at least one tank and configured to pump the liquid out from said at least one tank by way of a drain line, said drain pump being directly coupled to said drain line.

7. The liquid circulating system according to claim 6, wherein said drain line includes a section at an elevation higher than an elevation of said at least one tank.

8. The liquid circulating system according to claim 1 further comprises at least one temperature sensing device, and at least one pressure sensing device both of which being associated with said tank output line between said at least one heater and said three-way valve.

9. The liquid circulating system according to claim 8, wherein said liquid input line includes said liquid input line valve in communication with a liquid source, and wherein said second output of said three-way valve is directly coupled with said at least one tank by way of a second tank input line directly coupled to said second output of said at least one three-way valve.

10. The liquid circulating system according to claim 9 further comprises a third tank input line directly coupled to said tank output line downstream of said at least one circulation pump and with said at least one tank, said third tank input line bypasses said liquid usage device, and includes a third tank input line valve.

11. The liquid circulating system according to claim 10 further comprises at least one controller having internal electronics configured to operate said at least one controller, said at least one controller having a configuration capable of receiving a signal from said at least one temperature sensing device and said at least one pressure sensing device, respectively, and providing a control signal to at least one of said at least one heater, an ultra-violet system, said three-way valve, said at least one liquid input valve, said at least one circulation pump, a drain pump, and said third tank input line valve, respectively.

12. The liquid circulating system according to claim 4 further comprises at least one second by-pass line communicating with said first tank input line input line and a second liquid usage device.

13. The liquid circulating system according to claim 12 further comprises a fourth tank input line communicating with said at least one second by-pass line and said at least one tank.

14. The liquid circulating system according to claim 13, wherein said at least one second by-pass line includes at least one second by-pass line valve, and said fourth tank input line includes a restricted orifice.

15. The liquid circulating system according to claim 7 further comprises a second drain pump in communication with said interior of said at least one tank, said second drain pump includes an output line coupled to said at least one drain line, wherein said output line includes a section at an elevation higher than said elevation of said at least one tank.

16. The liquid circulating system according to claim 15 further comprising a tank overflow line directly coupled with said at least one tank and coupled to said at least one drain line, said tank overflow line includes a trap section.

17. The liquid circulating system according to claim 1, wherein said liquid usage device is associated with a bathing assembly selected from the group consisting of a shower stall, and a bathtub stall, and wherein said liquid usage device is selected from the group consisting of a shower head, and a faucet.

18. The liquid circulating system according to claim 17, wherein said at least one tank includes a floor surface having a sloping configuration toward an input of a tank drain line.

19. The liquid circulating system according to claim 18, wherein said at least one tank is remote from said bathing assembly, and said at least one tank is capable of receiving the liquid from said bathing assembly.

20. The liquid circulating system according to claim 18, wherein said at least one tank is integral with a base of said bathing assembly.

* * * * *